United States Patent [19]

Neri et al.

[11] Patent Number: 5,550,207

[45] Date of Patent: Aug. 27, 1996

[54] LINEAR COPOLYESTER CONTAINING PHOSPHOROUS, PROCEDURE FOR ITS PREPARATION AND ITS USE AS A FLAME-RESISTANT ADDITIVE

[75] Inventors: Carlo Neri, San Donato Milanese; Gianluigi Landoni, Milan, both of Italy

[73] Assignee: Enichem Synthesis S.p.A., Palermo, Italy

[21] Appl. No.: 247,525

[22] Filed: May 23, 1994

Related U.S. Application Data

[63] Continuation of Ser. No. 992,591, Dec. 18, 1992, abandoned.

[30] Foreign Application Priority Data

Dec. 18, 1991 [IT] Italy .................. MI91A3399

[51] Int. Cl.$^6$ .................................. C08G 79/02
[52] U.S. Cl. .................. 528/287; 528/272; 528/296; 528/301; 528/308; 528/308.6; 525/437; 525/438; 525/439; 525/444; 525/445
[58] Field of Search ................... 528/272, 287, 528/296, 301, 308, 308.6; 525/437, 438, 439, 444, 445

[56] References Cited

U.S. PATENT DOCUMENTS

| | | | |
|---|---|---|---|
| Re. 30,783 | 10/1981 | Kleiner et al. | 528/287 |
| 3,941,752 | 3/1976 | Kleiner et al. | 528/287 |
| 4,033,936 | 7/1977 | Bollert et al. | 528/287 |
| 5,151,494 | 9/1992 | Munday et al. | 528/287 |
| 5,180,793 | 1/1993 | Vigneault et al. | 525/446 |

OTHER PUBLICATIONS

Chemical Abstracts, 115, No. 10, Abstr. No. 94340d (Sep. 9, 1991).
Data Base STN, File REG No. Reg. No. 82690-14-0.
Data Base STN, File REG No. Reg. No. 135670-73-4.
Patent Abstracts of Japan, 15, No. 216, Abstr. No. C-837 (Jun. 4, 1991) "Polyester Non-Woven Fabric"—JP-A-30 64 561 (Mar. 19, 1991) JP-A-30 64 520 (Toray Ind. Inc.) (Mar. 19, 1991).
Patent Abstracts of Japan, 15, No. 216, Abstr. No. C-837 (Jun. 4, 1991) "Polyester Conugate Yarn"—JP-A-30 64 520 (Mar. 19, 1991).
Chemical Abstracts, 115, No. 6, Abstr. No. 51819z (Jan. 6, 1992).

*Primary Examiner*—Samuel A. Acquah
*Attorney, Agent, or Firm*—Rogers & Wells

[57] ABSTRACT

A linear copolyester is prepared by polycondensation of an aromatic bicarboxylic acid with an alkylene glycol and with a carboxyphosphinic acid or anhydride which produces monomeric units having the formula:

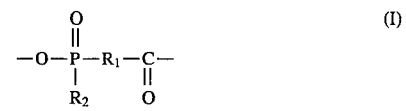

(I)

wherein $R_1$ is an alkylene or phenyl radical and $R_2$ is an alkyl or phenyl radical. This copolyester can be used as a flame-retardant additive for organic polymers.

9 Claims, No Drawings

LINEAR COPOLYESTER CONTAINING PHOSPHOROUS, PROCEDURE FOR ITS PREPARATION AND ITS USE AS A FLAME-RESISTANT ADDITIVE

This application is a continuation of application Ser. No. 07/992,591, filed Dec. 18, 1992, now abandoned.

The present invention relates to linear polyesters containing structural units based on phosphorous, the procedure for their preparation and their use as flame-retardant agents.

In the field of organic polymers there is a demand for flame-resistant products, especially in certain areas of application such as the textile industry.

Various flame-retardant additives, generally halogenated organic compounds or compounds containing phosphorous, are used and are applied by surface treatment of the product, for example in the finishing stage of a textile.

However, the use of these flame-retardant additives is not generally completely satisfactory, mainly because of their incompatibility with the organic polymers to which they are added, the release of the additive from the polymer and the high quantities of additive required to provide the necessary flame-retardant characteristics.

In accordance with another technique, the flame-retardant characteristics are obtained by introducing monomeric units containing phosphorous into the polymeric chain.

For example, flame-retardant linear polyesters are known in the art, obtained by polycondensing, in the presence of suitable catalysts, terephthalic acid, or its methyl diester, with an alkylene glycol, such as ethylene glycol, and with at least one monomeric unit containing phosphorous.

For example U.S. Pat. Nos. 3,941,752 and 4,033,936 describe flame-retardant linear polyesters obtained by the polycondensation of a bicarboxylic acid, an alkylene glycol and a monomer deriving from a phosphinic carboxy acid, one of its esters or its cyclic anhydride (2,5-dioxo-1,2-oxaphospholane), the latter in quantities ranging from 3 to 20 moles % with respect to the total quantity of acid components.

The use of these monomers containing phosphorous in the reaction for the preparation of the flame-retardant polymer may however cause disadvantages, due, for example, to the necessity of modifying the production plant of the polymer.

It has now been found that linear copolyesters containing high quantities of phosphorous in the macromolecule can be prepared and can be used as flame-retardant additives in the stabilization of a wide range of organic polymers, without having any of the disadvantages of the known art.

The present invention consequently relates to a linear copolyester, a flame-retardant additive for organic polymers, composed of the product of the polycondensation of an aromatic bicarboxylic acid with an alkylene glycol containing from 2 to 6 carbon atoms and with a monomer which produces in the chain of said copolyester units having the formula:

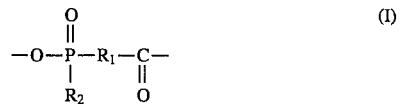

wherein $R_1$ is a linear alkylene radical, branched or cyclic containing from 1 to 6 carbon atoms, or a substituted or non-substituted phenyl radical, $R_2$ is an alkyl radical containing from 1 to 6 carbon atoms, or a substituted or non-substituted phenyl radical, said copolyester having a phosphorous content of at least 2.5% by weight, and preferably in the range of 3–6%.

Suitable bicarboxylic aromatic acids are, for example, terephthalic acid and isophthalic acid. Among these terephthalic acid is preferred.

Among the alkylene glycols containing from 2 to 6 carbon atoms, ethylene glycol, 1,4-butandiol, neo-pentylglycol and 1,4-cyclohexandiol are preferred. Particularly preferred is ethylene glycol.

In the units having formula (I), $R_1$ is preferably an alkylene radical containing 2 carbon atoms, whereas $R_2$ is preferably a methyl or phenyl.

Compounds which produce units having formula (I) in the copolyester chain are carboxy-phosphinic acids having the formula:

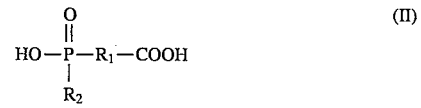

their esters with an alcohol containing from 1 to 4 carbon atoms or with a diol containing from 2 to 4 carbon atoms, in the latter case possibly in the form of oligomers containing up to 5 monomeric units, or it is also possible to use the corresponding cyclic anhydrides having the formula:

with $R^1$ and $R^2$ which, in both formulae (II) and (III), have the meaning defined above.

The linear copolyesters of the present invention are prepared according to a method, which is a further aspect of the present invention, and which consists in the polycondensation reaction of the respective comonomers, and i.e. of bicarboxylic aromatic acid, of alkylene glycol and of the carboxyphosphinic monomer which produce the units having formula (I).

The above copolyesters may also be prepared by a precondensation of the carboxyphosphinic compound with alkylene glycol, and subsequent treatment of these glycol esters with a prepolymer of bicarboxylic aromatic acid and alkylene glycol.

The linear copolyesters of the present invention are used as flame-retardant additives, suitable for providing flame-resistant characteristics to a wide range of organic polymers, such as linear polyesters with an aliphatic and/or aromatic structure, polyolefins, polyamides, polycarbonates, polyphenylen-oxides, polystyrenes, di- and ter- styrene polymers such as SAN and ABS, elastomeric copolymers such as EPR, EPDM, EVA.

In particular, the flame-retardant copolyester of the present invention is mixed and homogenized during the processing of the organic polymer in the molten state, which can then be transformed into end-products such as fibres, films, moulded items, etc.

The polymeric additives of the present invention are extremely compatible with the above organic polymers, forming real polymeric binders with these, and are also able to remain for long time within the polymeric material in which they are incorporated.

The quantity of copolyester of the present invention which is necessary for giving flame-retardant characteristics should be sufficient to ensure a phosphorous content (evaluated as an element) in the organic polymer ranging from 0.3 to 3% by weight, and preferably from 0.6 to 1.5% by weight.

The following examples provide a better illustration of the present invention but do not limit it in any way.

EXAMPLE 1

15 g of 1,2-oxaphospholane-5-one-2-methyl-2-oxide and 45 g of ethylene glycol are charged into a three-necked 250 cc flask equipped with a mechanical stirrer, nitrogen inlet and condenser.

The temperature is brought, under a $N_2$ atmosphere, to 120°–130° C., at which temperature the anhydride passes into solution. These conditions are maintained for 90 minutes, after which the excess glycol is distilled at reduced pressure, thus dehydrating the reaction mass at the same time.

The latter is then reacted with 60 g of a polyethyleneterephthalate prepolymer (PET) having a viscosity index V.I.=0.23 dl/g and containing 205 ppm of Sb (as $Sb_2O_3$). The reactor is evacuated and cleaned three times with $N_2$, and the system is then put under forced vacuum for 20 minutes.

The $N_2$ atmosphere is subsequently restored and the temperature brought to 250° C. by means of a heating fluid. After the homogeneous fusion of the mass, the temperature is brought to 275° C. and the pressure to 400 mm Hg over a period of 30 minutes. After an hour at constant temperature and continually increasing vacuum, a forced vacuum is applied and the system is spontaneously brought to 0.2 mm Hg.

The reaction mass becomes more and more viscous and after a further 90 minutes the condensation operation is concluded and 73.8 g of a copolyester are recovered at room temperature with the following elemental analysis: C=57.05%; H=5.10%; P=4.29%. The characteristics of the above polyester are shown in Table I.

The value of the melting DH, expressed as J/g, and the peak melting point, expressed in degrees centigrade, are determined by differential scan calorimetry (DSC), operating with a METTLER DSC 30 apparatus in a nitrogen atmosphere, with a gradient of 10° C./minute, within a temperature range of 35° to 300° C.

EXAMPLE 2

Using the same procedure described in example 1, 30 g of 1,2-oxaphospholane-5-one-2-methyl-2-oxide and 90 g of ethylene glycol are reacted at 120°–130° C. for 60 minutes.

40 cc of excess glycol are distilled and 0.5 g of tin-dibutyl-dilaurate are added to the anhydried reaction mass. The mixture is condensed at a temperature ranging from 175°–196° C. for 8 hours with a vacuum from 300 to 0.05 mm of Hg.

32.4 g of a distillate of ethylene glycol are obtained, whereas the residual product is characterized and is found to be an oligo-methyl-phosphin-β-propionate of ethylene glycol having 16.3% of phosphorous and a condensation degree of 3.36.

36.2 g of the above oligomer are reacted with 160 g of a PET prepolymer having a V.I.=0.40 dl/g and containing 245 ppm of Sb (as $Sb_2O_3$) at a constant temperature of 275° C. for two hours with a vacuum decreasing from 4 to 0.05 mm of Hg.

About 160 g of a copolyester are obtained with the following elemental analysis: C=57.09%; H=4.60%; P=3.09%.

EXAMPLE 3

Using the same procedure described in example 1, 23.35 g of phenyl-phosphin-β-propionic acid, 70 g of ethylene glycol and 60 g of a PET prepolymer with a V.I.=0.23 del/g containing 205 ppm of Sb (as $Sb_2O_3$), are made to react.

81.7 g of a copolyester are obtained with the following elemental analysis: C=59.51%; H=4.88%; P=4.03%.

EXAMPLE 4

Using the same procedure described in example 1, 32.42 g of 1,2-oxaphospholan-5-one-2-phenyl-2-oxide and 97 g of ethylene glycol and, after esterification and anhydrification, 95.85 g of a PET prepolymer with a V.I.=0.23 del/g containing 205 ppm of Sb (as $Sb_2O_3$), are charged.

123 g of a copolyester are obtained with the following elemental analysis: C=59.6%; H=4.77%; P=3.76%.

EXAMPLE 5

Using the same procedure described in example 1, 43.89 g of 1,2-oxaphospholan-5-one-2-phenyl-2-oxide, 97 g of ethylene glycol and 64.50 g of a PET prepolymer with a V.I.=0.23 del/g containing 205 ppm of Sb (as $Sb_2O_3$), are charged.

111.2 g of a copolyester are obtained with the following elemental analysis: C=59.26%; H=4.80%; P=5.45%.

EXAMPLE 6

Using the same procedure described in example 1, 120 g of 1,2-oxaphospholan-5-one-2-phenyl-2-oxide, and 250 g of ethylene glycol are made to react at 120°–130° C. for 90 minutes. 106 g of glycol are distilled at reduced pressure and 145 g of oligo-phenyl-β-propionate of ethylene glycol are recovered as a residue having 12.51% of phosphorous and a condensation degree of 5.63.

72 g of the above oligomer are reacted with 123 g of a PET prepolymer having a V.I.=0.40 dl/g and containing 245 ppm of Sb (as $Sb_2O_3$) at a temperature of 270°–275° C. for 70 minutes under a vacuum of 3 to 0.05 mm of Hg.

About 143 g of a copolyester are obtained with the following elemental analysis: C=59.26%; H=4.80%; P=4.57%.

EXAMPLE 7

14 parts of pellets of copolyester of example 1 are mixed with 86 parts of pellets of a polyethyleneterephthalate having a V.I.=0.65 dl/g and acidity of 20 meq/kg.

This blend is dried at 130° C. for 4 hours and spun directly on an automatic semi-industrial machine equipped with an extruder having 38 mm screws and 4 spinnerets of 45 mm in diameter.

A 50 dtex fibre is obtained with 10 circular floss operating with a recovery rate of 1200 m/minute. The phosphorous content is 0.6%.

These fibres, wound onto a spool after ensambling, are used to obtain tubular "socks" having a diameter of 10 cm which, when subjected to the Limited Oxygen Index (L.O.I.) flammability test, give a value of 31%. The L.O.I. for an identical product obtained without the addition of PET is 22%.

EXAMPLE 8

Using the same procedure described in example 7 a PET containing 18.6% of the copolyester of example 4 is spun.

The textile samples obtained show a L.O.I. of 3.5%.

EXAMPLE 9

A pre-dried blend composed of chips of commercial (Pibiter N 100) polybutyleneterephthalate (PBT) and of the copolyester of example 5, with a weight ratio of 78:22, is extruded in a Werner Pfleiderer ZSK 25 twin-screw extruder.

Test samples having a thickness of 1/16 inch are injection moulded with the extruded polymer for the UL94 vertical test.

The PBT with this additive is classified VO.

TABLE 1

| Additive | ΔH melting (J/g) | Peak melting point (°C.) | $T_g$ (°C.) | P % | Equivalent weight |
|---|---|---|---|---|---|
| Example 1 | 20.14 | 177.8 | 44.0 | 4.29 | 23,300 |
| Example 2 | 28.34 | 249.8 | 47.0 | 3.09 | 8,245 |
| Example 3 | — | — | 50.0 | 4.03 | 9,900 |
| Example 4 | — | — | 46.0 | 3.76 | 13,230 |
| Example 5 | — | — | 44.6 | 5.45 | 4,908 |
| Example 6 | 26.64 | 242.9 | — | 4.57 | 2,830 |

We claim:

1. A linear copolyester, which is useful as a flame retardant additive for organic polymers, is composed of a polycondensation product of a dicarboxylic aromatic acid with a $C_2$–$C_6$ alkylene glycol and with a monomer which, in the chain of the copolyester, produces units having the formula:

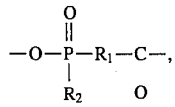

where $R_1$ is a $C_1$–$C_6$ linear, branched or cyclic alkylene group and $R_2$ is a $C_1$–$C_6$ aklyl group or a phenyl group, wherein the copolyester has a phosphorous content of 4.03 to 6% by weight.

2. The additive claim 1, wherein the dicarboxylic aromatic acid is terephthalic acid.

3. The additive of claim 1, wherein the alkylene glycol is ethylene gylcol.

4. The additive of claim 1, wherein $R_1$ is the $C_2$ alkylene group.

5. The additive of claim 1, wherein $R_2$ is the methyl or phenyl group.

6. The additive of claim 1, wherein the phosphorous-containing monomer is selected from the group consisting of (a) a carboxyphosphinic acid having the formula

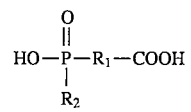

(b) an ester thereof with a $C_1$–$C_4$ alcohol or a $C_2$–$C_4$ diol, (c) an oligomer of the ester containing up to 5 monomer units, and a (d) a cyclic anhydride thereof having the formula

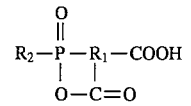

where $R_1$ is a $C_1$–$C_6$ linear, branched, or cyclic alkylene group and $R_2$ is a $C_1$–$C_6$ alkyl group or a phenyl group.

7. The additive of claim 1, wherein the dicarboxylic aromatic acid is terephthalic acid; wherein the alkylene glycol is ethylene glycol; wherein, in the monomer, $R_1$ is the $C_2$ alkylene group and $R_2$ is the methyl or the phenyl group.

8. The additive of claim 1, wherein the dicarboxylic aromatic acid is terephthalic acid; wherein the alkylene glycol is ethylene glycol; wherein the phosphorous-containing monomer is selected from (a) carboxyphosphinic acid having the formula

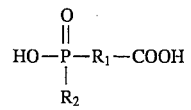

(b) an ester thereof with a $C_1$–$C_4$ alcohol or a $C_2$–$C_4$ diol, (c) an oligomer of the ester containing up to 5 monomer units, and (d) a cyclic anhydride thereof having the formula

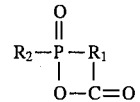

where $R_1$ is a $C_1$–$C_6$ linear, branched, or cyclic alkylene group and $R_2$ is a $C_1$–$C_6$ alkyl group or a phenyl group.

9. A process for preparing the additive of claim 1 by polycondensing the dicarboxylic aromatic acid, the alkylene glycol, and the phosphorus-containing monomer.

* * * * *